(12) United States Patent
Sakai et al.

(10) Patent No.: US 7,860,697 B2
(45) Date of Patent: Dec. 28, 2010

(54) SIMULATING SYSTEM, SIMULATING APPARATUS, IMAGE FORMING APPARATUS, AND SIMULATING METHOD

(75) Inventors: Akihiko Sakai, Abiko (JP); Toshio Hayashi, Toride (JP); Masashi Oyumi, Abiko (JP)

(73) Assignee: Canon Kabushiki Kaisha (JP)

(*) Notice: Subject to any disclaimer, the term of this patent is extended or adjusted under 35 U.S.C. 154(b) by 907 days.

(21) Appl. No.: 11/539,702

(22) Filed: Oct. 9, 2006

(65) Prior Publication Data
US 2007/0143089 A1    Jun. 21, 2007

(30) Foreign Application Priority Data
Dec. 20, 2005    (JP)    ............... 2005-366420

(51) Int. Cl.
*G06F 17/50*    (2006.01)
(52) U.S. Cl. ................ 703/13; 382/181; 382/131; 382/312; 382/294; 382/275
(58) Field of Classification Search ........... 382/131, 382/181, 312, 294, 275; 703/13
See application file for complete search history.

(56) References Cited

U.S. PATENT DOCUMENTS 6,181,832 B1 *    1/2001    Maas, III ............... 382/294

FOREIGN PATENT DOCUMENTS

| JP | 10-187494 A | 7/1998 |
|---|---|---|
| JP | 2002-007483 A | 1/2002 |

* cited by examiner

*Primary Examiner*—Kamini S Shah
*Assistant Examiner*—Saif A Alhija
(74) *Attorney, Agent, or Firm*—Rossi, Kimms & McDowell LLP

(57) ABSTRACT

A simulating system having: a data retrieving device which time-sequentially retrieves a control value which is outputted from a control system in an image forming apparatus to a controlled system and an input value inputted from the controlled system to the control system as a control result; a data storing device which stores a time-series data group including a plurality of control values and the input values corresponding to the control values; and a simulating device which simulates the control result of the image forming apparatus corresponding to the control value outputted to the controlled system in accordance with an algorithm, wherein a correlation between each of the control values and the input value corresponding to each of the control values included in the time-series data group has been implemented.

12 Claims, 9 Drawing Sheets

SIMULATING SYSTEM, SIMULATING APPARATUS, IMAGE FORMING APPARATUS, AND SIMULATING METHOD

BACKGROUND OF THE INVENTION

1. Field of the Invention

The present invention relates to a simulating system, a simulating apparatus, an image forming apparatus, and a simulating method for simulating the operation of the image forming apparatus.

2. Description of the Related Art

In recent years, a request for the realization of high picture quality, high mass-productivity, and the like by the user is increasing for image input/output apparatuses of an electrophotographic system. It is also demanded to promptly cope with such a request. Thus, it is necessary to more efficiently perform development of products for a shorter period of time. This is true of development of software for controlling the apparatus.

Hitherto, as a method of satisfying such a request, there is a simulating method using an apparatus virtually constructed by software on a PC (Personal Computer). In Japanese Patent Application Laid-Open No. H10-187494 and Japanese Patent Application Laid-Open No. 2002-007483, there has been proposed such a technique that the software to be installed is verified by the simulating method in the state where there are no firmware installed in the image forming apparatus of the electrophotographic system.

Owing to the above software verifying technique, the operation such as creation of actual apparatus software, correction of an inconvenience, or the like can be previously executed at the stage prior to examining an experimental model of the image forming apparatus. Thus, control firmware for the final product can be completed in its early stages.

To make the software development mainly using the foregoing simulation, it is ideal that the operation of the firmware on the actual apparatus and the firmware operation on a simulator are identical. However, identifying precision of the simulation to the operation of the actual apparatus cannot be set to such precision that the operation of the firmware on the actual apparatus and the firmware operation on the simulator are made substantially identical. For example, in the case where the identifying precision is low and the operation of the firmware on the simulator largely differs from that on the actual apparatus, it is very difficult to verify the firmware of the actual apparatus by the simulation. Therefore, it is desirable and important to improve the identifying precision and allow the operation of the firmware on the simulator to be nearly identical to the operation of the firmware on the actual apparatus as much as possible.

For example, in the case of electronic parts, a unit, or the like in which an operation algorithm to specify the actual operation is distinct, since the identifying precision by the simulation mentioned above is relatively high, it is very effective to verify the operation of the actual apparatus on the basis of the firmware operation on the simulator.

However, since the operation of the whole image forming apparatus is realized since various physical phenomena such as conveying operation of a sheet and transfer operation of a toner image are concerned with each other, there are many obscure points with respect to the operation algorithm. It is, therefore, very difficult to improve the identifying precision on the simulator with respect to the operation of the image forming apparatus.

In the development of the software, therefore, the fundamental operation verification of the software is made by using the simulator based on the simple algorithm. Thus, it is finally necessary to confirm the operation of the experimental model or the actual apparatus and adjust details of the control firmware.

To complete the image forming apparatus as a final product, it is necessary to predict use conditions such as various use environments, use pattern of the user, and the like and execute durability tests under the predicted use conditions. Therefore, whether or not a problem occurs is verified by the durability tests with respect to the operations of the hardware and software.

However, since the latest hardware is often installed in order to improve functions and performance of the apparatus, the control firmware is complicated more and more. Consequently, there is a case where the actual use conditions of the apparatus shipped as a product after succeeding in the durability tests and the like under the predicted use conditions differ from the predicted use conditions. In such a case, there is a case of occurrence of an unexpected inconvenience on the control.

SUMMARY OF THE INVENTION

It is an object of the invention to provide a simulating system, a simulating apparatus, an image forming apparatus, a simulating method, a program, and a storing medium in which the operation of the image forming apparatus can be simulated at high identifying precision.

To accomplish the above object, according to the first aspect of the invention, there is provided a simulating system comprising a data retrieving device which time-sequentially retrieves a control value which is outputted from a control system in an image forming apparatus to a controlled system and an input value which is inputted from the controlled system to the control system as a control result of the controlled system by the control value, a data storing device which stores a time-series data group including a plurality of control values which have time-sequentially been retrieved by the data retrieving device and the input values corresponding to the control values, and a simulating device which simulates the control result of the controlled system of the image forming apparatus corresponding to the control value which is outputted to the controlled system in accordance with an algorithm to identify the operation of the controlled system of the image forming apparatus, wherein a correlation between each of the control values and the input value corresponding to each of the control values included in the time-series data group stored in the data storing device has been implemented in the algorithm of the simulating device.

To accomplish the above object, according to the second aspect of the invention, there is provided a simulating apparatus for simulating the operation of an image forming apparatus having a data retrieving device which time-sequentially retrieves a control value which is outputted from a control system to a controlled system and an input value which is inputted from the controlled system to the control system as a control result of the controlled system by the control value and a data storing device which stores a time-series data group including a plurality of control values which have time-sequentially been retrieved by the data retrieving device and the input values corresponding to the control values, comprising a simulating device which simulates the control result of the controlled system of the image forming apparatus corresponding to the control value which is outputted to the controlled system in accordance with an algorithm to identify the operation of the controlled system of the image forming apparatus, wherein a correlation between each of the control values and the input value corresponding to each of the control values included in the time-series data group stored in the data storing device has been implemented in the algorithm.

To accomplish the above object, according to the third aspect of the invention, there is provided an image forming apparatus comprising a data retrieving device which time-sequentially retrieves a control value which is outputted from a control system to a controlled system and an input value which is inputted from the controlled system to the control system as a control result of the controlled system by the control value, and a data storing device which stores a time-series data group including a plurality of control values which have time-sequentially been retrieved by the data retrieving device and the input values corresponding to the control values, wherein a correlation between each of the control values and the input value corresponding to each of the control values included in the time-series data group is used when the control result of the controlled system by the control value which is outputted from the control system to the controlled system is simulated by a simulating device.

To accomplish the above object, according to the fourth aspect of the invention, there is provided a simulating method comprising a data retrieving step of time-sequentially retrieving a control value which is outputted from a control system in an image forming apparatus to a controlled system and an input value which is inputted from the controlled system to the control system as a control result of the controlled system by the control value, a data storing step of storing a time-series data group including a plurality of control values which have time-sequentially been retrieved in the data retrieving step and the input values corresponding to the control values into a storing device, and a simulating step of simulating the control result of the controlled system of the image forming apparatus corresponding to the control value which is outputted to the controlled system in accordance with an algorithm to identify the operation of the controlled system of the image forming apparatus, wherein a correlation between each of the control values and the input value corresponding to each of the control values included in the time-series data group stored in the storing device has been implemented in the algorithm.

Further features of the present invention will become apparent from the following description of exemplary embodiments (with reference to the attached drawings).

DESCRIPTION OF THE EMBODIMENTS

Embodiments of the invention will be described hereinbelow with reference to the drawings.

Figure 1:
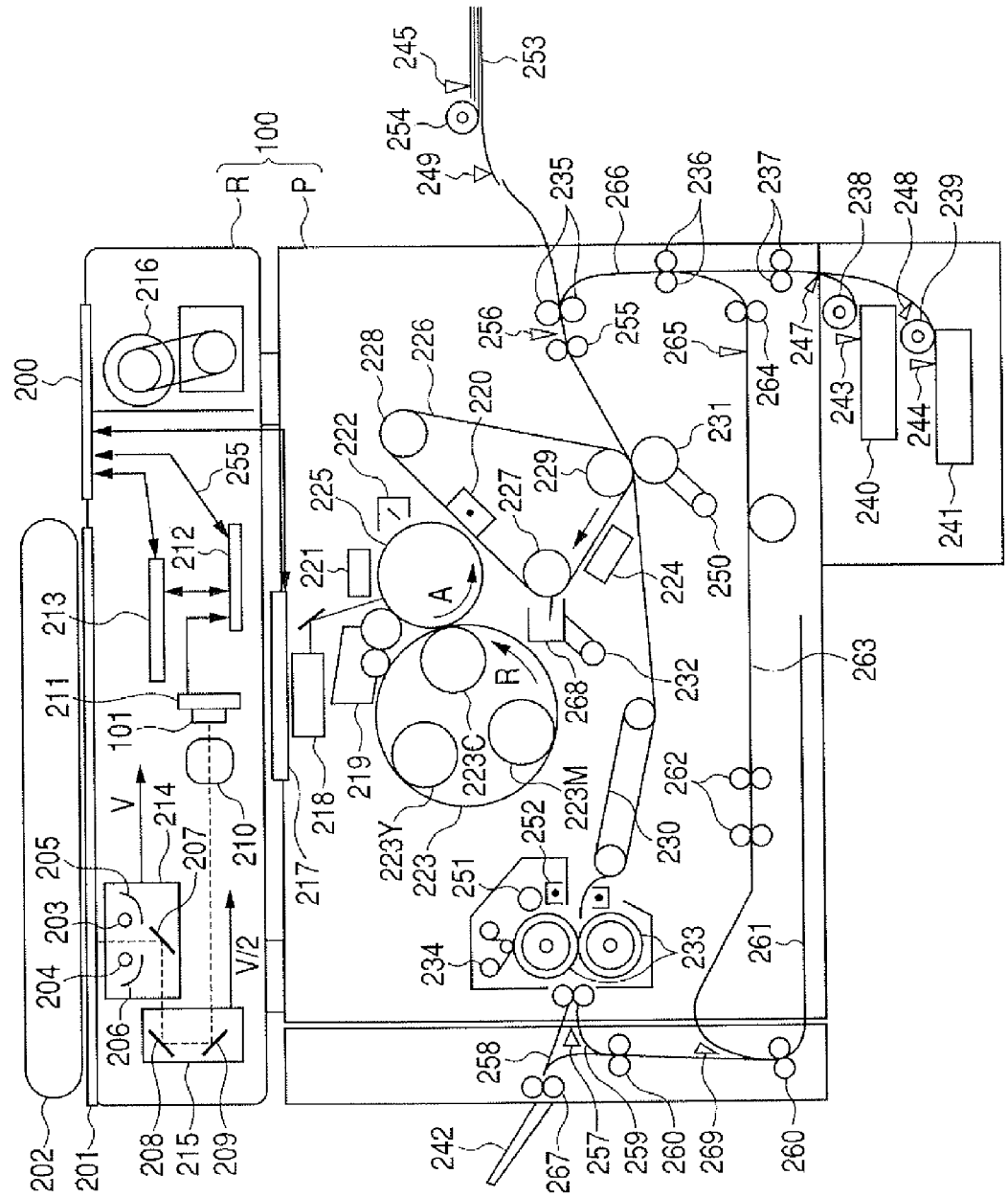
FIG. 1 is a vertical sectional view showing a construction of an image forming apparatus constructing a simulating system according to an embodiment of the invention.
Figure 2:
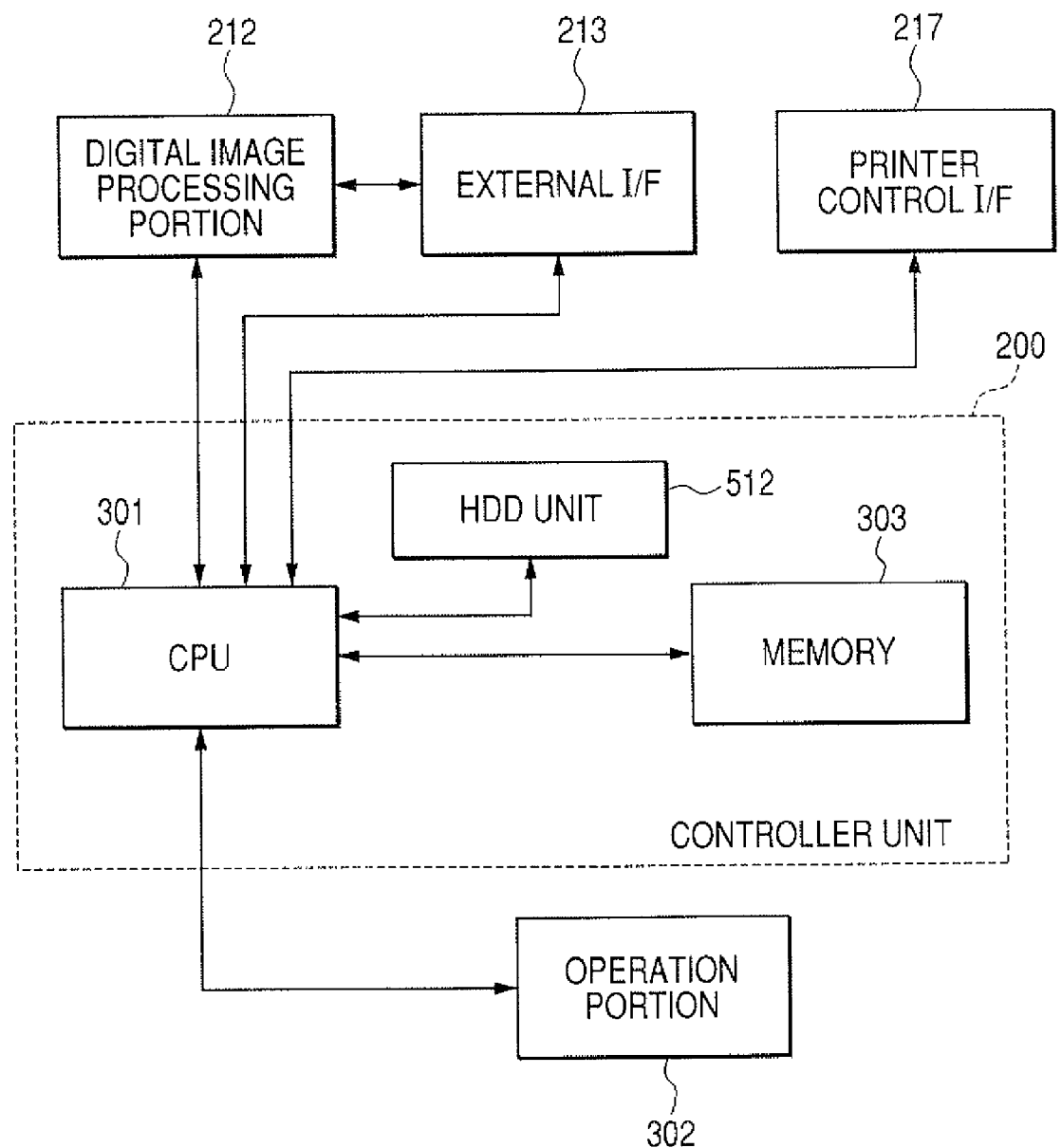
FIG. 2 is a block diagram showing a construction of a controller unit 200 in FIG. 1.
Figure 3:
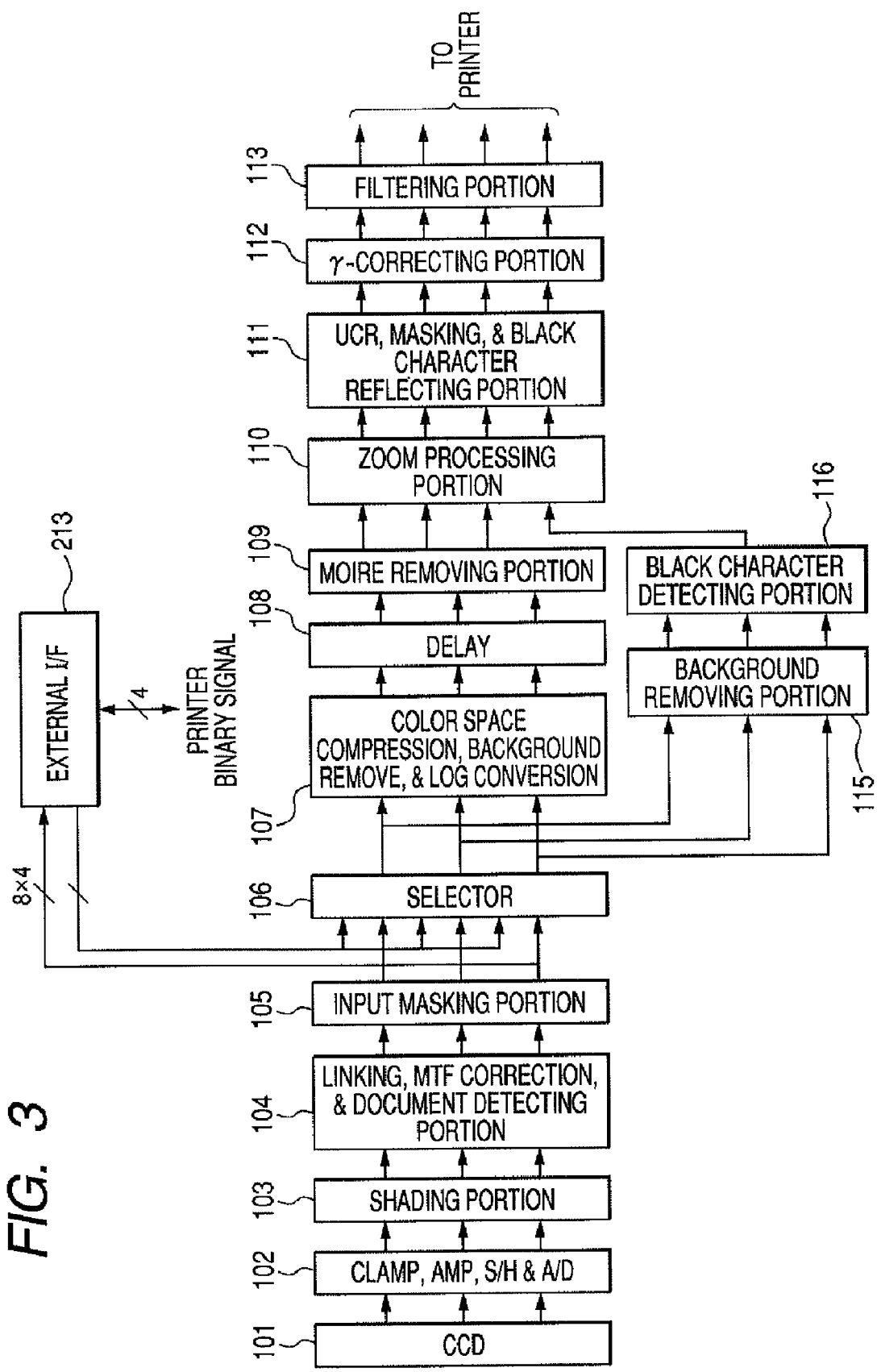
FIG. 3 is a block diagram showing a construction of a digital image processing portion 212 in FIG. 1.
Figure 4:
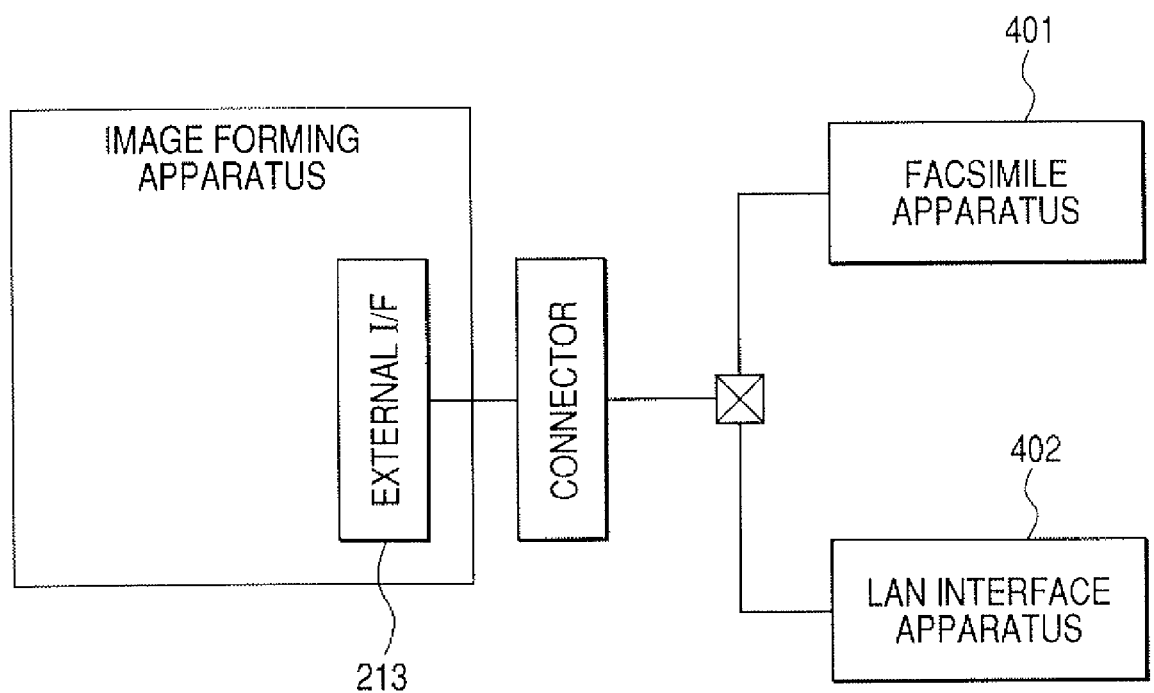
FIG. 4 is a block diagram schematically showing a connecting state between an external I/F (interface) 213 in FIG. 2 and external apparatuses.

FIG. 1 is a vertical sectional view showing a construction of an image forming apparatus constructing a simulating system according to the embodiment of the invention. FIG. 2 is a block diagram showing a construction of a controller unit 200 in FIG. 1. FIG. 3 is a block diagram showing a construction of a digital image processing portion 212 in FIG. 1. FIG. 4 is a block diagram schematically showing a connecting state between an external I/F 213 in FIG. 2 and external apparatuses.

As shown in FIG. 1, an image forming apparatus 100 has: a reader portion R which can read a color document; and a printer portion P which can form a color image onto a sheet by the electrophotographic system.

The reader portion R has an automatic document feeder (ADF) 202 for feeding a document onto a copyboard glass plate (platen) 201. The document fed from the ADF 202 to the copyboard glass plate 201 is illuminated by light which has been emitted from each of light sources 203 and 204 such as halogen lamp, fluorescent lamp, and the like and reflected by corresponding reflecting parasols 205 and 206. The reflection light from the illuminated document is reflected by mirrors 207 to 209, passes through a lens 210, and is formed as an image onto a color CCD 101 which is provided for a board 211. The light sources 203 and 204 and the mirror 207 are enclosed in a carriage 214. The mirrors 208 and 209 are enclosed in a carriage 215. The carriage 214 is moved at a speed V and the carriage 215 is moved at a speed V/2 in the sub-scanning direction by a driving motor 216. The sub-scanning direction is a direction which perpendicularly crosses the electrical scanning direction (main scanning direction) of the CCD 101. The whole surface of the document on the copyboard glass plate 201 is scanned (sub-scanned) by the movement of the carriages 214 and 215.

The CCD 101 converts the formed light image into an electric signal (analog image signal). The electric signal is inputted to the digital image processing portion 212 through the board 211. The digital image processing portion 212 converts the electric signal inputted from the CCD 101 into a digital signal, executes various processes to the digital signal, and forms signals of C (cyan), M (magenta), Y (yellow), and K (black). The digital image processing portion 212 executes various processes to image data inputted through the external I/F 213 and forms signals of C, M, Y, and K.

Specifically speaking, as shown in FIG. 3, the digital image processing portion 212 has a sample-and-hold portion (Clamp & Amp & S/H & A/D) 102 to which the electric signal (analog image signal) from the CCD 101 is inputted. The sample and hold portion 102 samples and holds (S/H) the inputted analog image signal and clamps a dark level of the analog image signal to a reference electric potential. After the analog image signal is amplified to a predetermined level, it is converted into digital image signals, for example, digital signals of R, G, and B each consisting of 8 bits.

Subsequently, the digital signals of R, G, and B are inputted to a shading portion 103. The shading portion 103 performs shading correction and black correction to each of the inputted digital signals of R, G, and B. The corrected digital signals of R, G, and B are inputted to a linking portion (linking, MTF correction, & document detecting portion) 104. The linking portion 104 executes a linking process, MTF correction, and a document detecting process. When the CCD 101 is a 3-line CCD, since reading positions among the lines differ, the linking process adjusts a delay amount of each line in accordance with a reading speed and corrects signal timing so that the reading positions of three lines coincide. Since the reading MTF changes depending on the reading speed and a magnification, the MTF correction is made to correct a change in MTF. The document detecting process detects a document size by scanning the document on the copyboard glass plate 201.

The digital signals of R, G, and B whose reading position timing have been corrected by the linking portion 104 are inputted to an input masking portion 105. The input masking portion 105 corrects spectral characteristics of the CCD 101 and spectral characteristics of the light sources 203 and 204 and the reflecting parasols 205 and 206. The digital signals of R, G, and B outputted from the input masking portion 105 are inputted to a selector 106 which can switch the inputted digital signals of R, G, and B and signals which are inputted from the external I/F (interface) 213. Other signals are also inputted to the selector 106 from an external apparatus through the external I/F 213. The selector 106 outputs the RGB digital signals to the external I/F 213 or a downstream block, which will be explained hereinafter, or outputs the signals inputted through the external I/F 213 to the downstream block, which will be explained hereinafter.

The RGB digital signals outputted from the selector 106 are inputted to a color conversion portion (color space compression, background remove, & LOG conversion portion) 107 and a background removing portion 115, respectively. The background removing portion 115 executes a background removal to each of the inputted RGB digital signals. The RGB digital signals obtained after completion of the background removal are inputted to a black character detecting portion 116. The black character detecting portion 116 discriminates whether or not characters in the document are black characters and forms a black character signal from the document.

The color conversion portion 107 discriminates whether or not each of the RGB digital signals from the selector 106 is a signal within a range where it can be reconstructed by the printer portion P. If the RGB digital signals are not the signals within the range where they can be reconstructed by the printer portion P, the RGB digital signals are corrected so as to become the signals within the range where they can be reconstructed by the printer portion P. If the RGB digital signals are the signals within the range where they can be reconstructed by the printer portion P, no correction is made to those signals. After the background removing process are executed to the RGB digital signals, the RGB digital signals are converted into the signals of C, M, and Y by LOG conversion.

The signals of C, M, and Y outputted from the color conversion portion 107 are delayed in a delay portion 108 in order to adjust output timing. The delayed signals of C, M, and Y are inputted to a moire removing portion 109 together with the signals formed in the black character detecting portion 116.

The moire removing portion 109 removes a moire from each of the inputted CMY signals. The moire-removed CMY signals are inputted to a zoom processing portion 110. The zoom processing portion 110 executes a zooming process in the main scanning direction to the inputted CMY signals. The zoomed CMY signals are inputted to a CMYK signal forming portion (UCR, masking, & black character reflecting portion) 111. The CMYK signal forming portion 111 forms signals of C, M, Y, and K from the CMY signals by the UCR process. The formed CMYK signals are corrected to signals adapted to an output of the printer portion P by a masking process. The discrimination signal formed in the black character detecting portion 116 is fed back to the CMYK signals, respectively.

The CMYK signals formed in the CMYK signal forming portion 111 are density-adjusted in a gamma (γ) correcting portion 112 and, thereafter, inputted to a filtering portion 113. The filtering portion 113 executes a smoothing or edge process to the inputted CMYK signals and outputs the processed CMYK signals.

The CMYK signals formed in the digital image processing portion 212 are inputted to the controller unit 200. The controller unit 200 sends the inputted CMYK signals to the printer portion P through a printer control I/F (interface) 217.

Specifically speaking, as shown in FIG. 2, the controller unit 200 has a CPU 301 for controlling the whole image forming apparatus and executing individual processes in accordance with programs stored in a memory 303 or an HDD (hard disk drive) unit 512. The controller unit 200 has an I/F (interface) for connecting the CPU 301 and each of the digital image processing portion 212, external I/F 213, and printer control I/F 217. The controller unit 200 transmits and receives information for controlling to/from each of the external I/F 213 and the printer control I/F 217 through such an I/F. The external I/F 213 is an interface for transmitting and receiving image data such as image information, code information, and the like to/from the external apparatus. Specifically speaking, as shown in FIG. 4, a facsimile apparatus 401 and an LAN interface apparatus 402, and the like can be connected to the external I/F 213. The printer control I/F 217 is an interface for connecting the CPU 301 and the printer portion P. A control signal for the printer portion P from the CPU 301 is inputted to the printer control I/F 217 together with the CMYK signals sent from the digital image processing portion 212 through the CPU 301.

The CPU 301 also has an I/F (interface) for connecting an operation portion 302 and executes corresponding control or process on the basis of operation information which is inputted from the operation portion 302 through such an I/F. Information to be displayed to a display panel provided for the operation portion 302 is also sent to the operation portion 302 through the I/F.

The operation portion 302 has the display panel and hardware keys for inputting information such as operation information or the like by the user. Various kinds of information such as setting contents, input information, and the like are displayed on the display panel. Software keys for inputting information such as operation information or the like can be also displayed on the display panel.

As shown in FIG. 1, the printer portion P has a photosensitive member 225 which is rotated in the direction shown by an arrow A in the diagram. A primary charging unit 221, an exposing apparatus 218, a black developing apparatus 219, a color developing unit 223, a transfer charging unit 220, and a cleaner 222 are arranged around the photosensitive member 225.

The primary charging unit 221 is a charging unit for charging the surface of the photosensitive member 225 so as to have a uniform electric potential. The exposing apparatus 218 modulates a laser beam on the basis of each of the CMYK signals inputted through the printer control I/F 217 and exposes and scans the surface of the photosensitive member 225 by the modulated laser beam. Thus, an electrostatic latent image corresponding to each of the C, M, Y, and K colors is formed on the surface of the photosensitive member 225.

The black developing apparatus 219 supplies black toner to the photosensitive member 225 on which the black electrostatic latent image has been formed. Thus, the black electrostatic latent image formed on the surface of the photosensitive member 225 is visualized as a black toner image. The color developing unit 223 has three developing apparatuses 223Y, 223M, and 223C for full-color development. The developing apparatus 223Y supplies yellow toner to the photosensitive member 225 on which the yellow electrostatic latent image has been formed and visualizes the yellow electrostatic latent image as a yellow toner image. The developing apparatus 223M supplies magenta toner to the photosensitive member 225 on which the magenta electrostatic latent image has been formed and visualizes the magenta electrostatic latent image as a magenta toner image. The developing apparatus 223C supplies cyan toner to the photosensitive member 225 on which the cyan electrostatic latent image has been formed and visualizes the cyan electrostatic latent image as a cyan toner image. When the images of the C, M, and Y colors are developed, the color developing unit 223 is rotated in the direction shown by an arrow R in the diagram and positioned so that the developing apparatus of the corresponding color is come into contact with the photosensitive member 225.

Each time the toner image is formed on the photosensitive member 225, the toner image is transferred onto an intermediate transfer belt 226 by the transfer charging unit 220. That is, the toner images of four colors of C, M, Y, and K are overlaid and transferred onto the intermediate transfer belt 226. Thus, a full-color toner image is formed on the intermediate transfer belt 226. The toner remaining on the photosensitive member 225 after the toner images were transferred onto the intermediate transfer belt 226 is removed by the cleaner 222.

The intermediate transfer belt 226 has a circumferential length which is n (n is an integer) times as long as a length of an outer circumference of the photosensitive member 225. Owing to the relation between the circumferential length of the intermediate transfer belt 226 and the outer circumference of the photosensitive member 225 as mentioned above, while the intermediate transfer belt 226 rotates once, the photosensitive member 225 rotates an integer number of times and is returned to substantially the same state as that before the intermediate transfer belt 226 rotates once. Therefore, when the toner images of four colors are overlaid onto the intermediate transfer belt 226 (the intermediate transfer belt 226 rotates four times), a color deviation that is caused by a variation in rotational speed of the photosensitive member 225 can be avoided.

The circumferential length of the intermediate transfer belt 226 is set to a length in which the toner images whose size along its circumferential direction is equal to a predetermined size, for example, at least two images of the A4 size (corresponding to two sheets) can be transferred. Thus, while the intermediate transfer belt 226 rotates four times in order to form the color image in which the images of four colors have been overlaid, the color toner images corresponding to the two sheets can be transferred onto the intermediate transfer belt 226. Such an operation is called a "double transfer" and the mass-productivity is improved by such a function.

The intermediate transfer belt 226 is suspended among rollers 227, 228, and 229. The roller 227 is a driving roller for driving the intermediate transfer belt 226. The roller 228 is a tension roller for adjusting a tension of the intermediate transfer belt 226. The roller 229 is a backup roller for a secondary transfer roller 231. A reflecting type sensor 224 to detect a reference position is arranged between the rollers 227 and 229. The reflecting type sensor 224 detects a marking such as a reflection tape or the like adhered to an edge portion of an outer peripheral surface of the intermediate transfer belt 226 and outputs an I-top signal. The I-top signal is a signal to instruct the start of image creation. When this signal is inputted to the exposing apparatus 218, the exposing apparatus 218 emits the laser beam and starts the exposure and scanning to the photosensitive member 225.

The secondary transfer roller 231 is driven by a transfer roller detachable unit 250 so as to be come into contact with and removed from the intermediate transfer belt 226. A belt cleaner 268 is provided at a position where it faces the roller 227 through the intermediate transfer belt 226. The belt cleaner 268 is driven by a belt cleaner detachable unit 232 so as to be come into contact with and removed from the intermediate transfer belt 226. When the belt cleaner 268 is come into contact with the intermediate transfer belt 226, the remaining toner on the intermediate transfer belt 226 is scraped off by a blade of the belt cleaner 268.

The toner image formed on the intermediate transfer belt 226 is transferred to the sheet fed from a cassette 240 or 241 or a manual feeding portion 253. Specifically speaking, the sheets enclosed in each of the cassettes 240 and 241 are picked up one by one by pickup rollers 238 and 239 and conveyed toward a resist roller 255 along a feeding path 266 by each of feed roller pairs 237, 236, and 235. The sheets stacked in the manual feeding portion 253 are picked up one by one by a pickup roller 254 and conveyed toward the resist roller 255 through the feed roller pair 235. Sheet absence detecting sensors 243, 244, and 245 to detect the presence or absence of the sheet are provided for the cassettes 240 and 241 and the manual feeding portion 253, respectively. Paper feed sensors 247, 248, and 249 to detect the defective pickup of the sheet are also provided for the cassettes 240 and 241 and the manual feeding portion 253, respectively.

The sheet fed out of the cassette 240 or 241 or the manual feeding portion 253 is temporarily stopped in the state where its front edge has been abutted with the resist roller 255 which is in the driving stop state. Thus, an oblique movement of the sheet is corrected. After the correction of the oblique movement, the resist roller 255 is driven in accordance with the image creation start timing (transfer timing), so that the sheet is fed to a nip portion formed between the secondary transfer roller 231 and the intermediate transfer belt 226. In this instance, the secondary transfer roller 231 is driven by the transfer roller detachable unit 250 and is in contact with the intermediate transfer belt 226. The toner image formed on the intermediate transfer belt 226 is transferred onto the fed sheet in the nip portion. The sheet to which the toner image has been transferred is sent to a fixing apparatus 234 through a conveying belt 230.

The fixing apparatus 234 has two pre-fixing charging units 251 and 252 for supplementing an adsorbing force of the toner image on the sheet and a pair of fixing rollers 233. A nip portion to sandwich and convey the sheet is formed between the fixing rollers 233. When the sheet passes through the nip portion, the toner image on the sheet is pressed with heat and fixed onto the sheet.

The sheet which passed through the fixing apparatus 234 is guided to a discharge path 258 or a reverse path 259 by a sheet flapper 257. The sheet obtained after the image creation is guided to the discharge path 258 by the sheet flapper 257. The sheet is ejected to a discharge tray 242 through a discharge roller 267.

In a duplex mode to form images onto both surfaces of the sheet, the sheet in which the image has been formed on the obverse surface is guided to the reverse path 259 by the flapper 257. The sheet is temporarily conveyed into a duplex reversing path 261 by each of reversing rollers 260.

Subsequently, after the sheet was conveyed into the duplex reversing path 261 by an amount corresponding to a width in a feeding direction, a conveying direction of the sheet is switched by a duplex reversing path guide 269. The obverse and reverse sides of the sheet are reversed by the reverse rotation of the reversing rollers 260 and the driving of duplex path conveying rollers 262. In the state where the image forming surface of the sheet faces down, the sheet is conveyed toward a re-feed roller 264 along a duplex path 263.

The sheet which is conveyed toward the re-feed roller 264 is detected by a feed sensor 265 arranged at a position just before the re-feed roller 264. When a predetermined time until the front edge of the sheet is abutted with the re-feed roller 264 whose driving has been stopped elapses from the point of time of the detection, the sheet conveying operation is temporarily stopped. Thus, the oblique movement of the sheet is corrected.

When predetermined timing comes after the correction of the oblique movement, the re-feed roller 264 is activated and the sheet is conveyed again to the feeding path 266 in the state where the image forming surface is set to the reverse side. The image is formed onto the reverse surface of the sheet by a procedure similar to that in the image creation to the obverse surface of the sheet. The sheet in which the images have been formed on both of the obverse and reverse surfaces in this manner is guided to the discharge path 258 and ejected onto the discharge tray 242 by the sheet flapper 257.

The image forming apparatus 100 in the embodiment is constructed particularly on the assumption that the design and verification of control firmware for the image forming portion (system including processes from the exposure to the secondary transfer) are executed in a simulating environment on a general-purpose PC as a prerequisite condition. That is, the image forming apparatus 100 is constructed by a control unit architecture including the firmware and control hardware which satisfy the above prerequisite condition.

Figure 5:
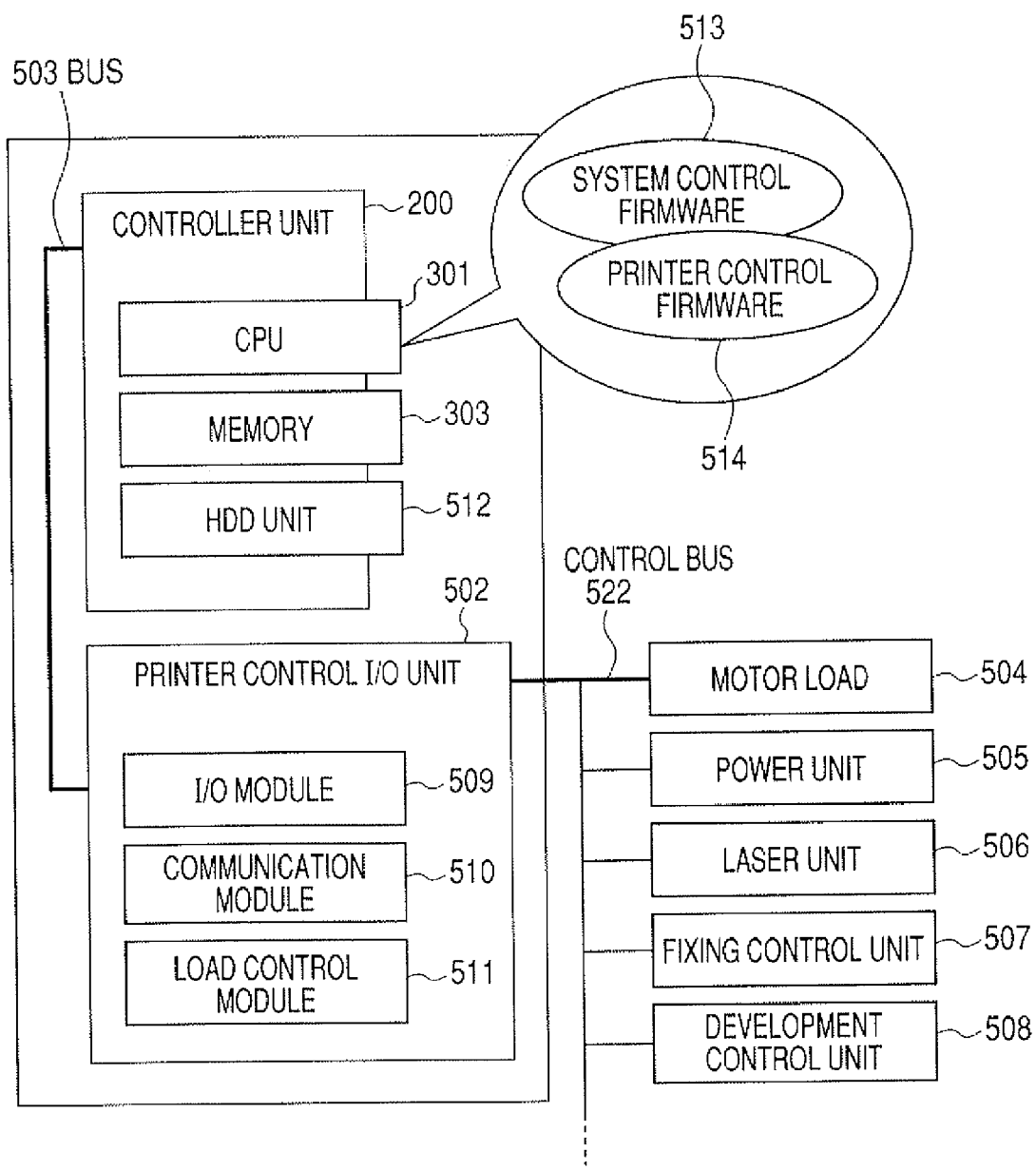
FIG. 5 is a block diagram showing a control unit architecture in the image forming apparatus in FIG. 1.

The control unit architecture in the embodiment will be described in detail with reference to FIG. 5 also with respect to a correlation with the controller unit 200. FIG. 5 is a block diagram showing the control unit architecture in the image forming apparatus in FIG. 1.

As shown in FIG. 5, the control unit architecture in the embodiment is constructed by: the controller unit 200 to control the whole operation of the image forming apparatus 100; and a printer control I/O (input/output) unit 502 which functions as a control I/O for the printer portion P. The printer control I/O unit 502 has an I/O module 509, a serial communication module 510, and a load control module 511. The I/O module 509 and the serial communication module 510 are provided as communicating means with a plurality of control elements which are necessary for the image forming operation. Control elements such as motor load 504, power unit 505, laser unit 506, fixing control unit 507, development control unit 508, and the like are connected to the printer control I/O unit 502 through a control bus 522. The control elements are controlled by the printer control I/O unit 502 through the control bus 522.

There are the motor load 504, power unit 505, laser unit 506, fixing control unit 507, development control unit 508, and the like as control elements. The motor load 504 is a unit for controlling various motors such as a motor to drive the conveying roller, and the like. The power unit 505 is a unit for controlling an input power source and a power supply to each block. The laser unit 506 is a unit for controlling the operation of the exposing apparatus 218. The fixing control unit 507 is a unit for controlling a temperature and the like in the fixing apparatus 234. The development control unit 508 is a unit for controlling the operations of the black developing apparatus 219, the color developing unit 223, and the like.

The load control module 511 is a dedicated control circuit module which is used in the case where accurate timing control is required by using a clock signal or the like when each of the control elements is controlled. All of the operations of control elements other than the control elements which are controlled by the load control module 511 or the operations of a combination of the control elements are integratedly controlled by the CPU 301 on the controller unit 200 in cooperation with other system control elements in or out of the image forming apparatus 100. Therefore, the printer control I/O unit 502 itself does not have a CPU therein.

The controller unit 200 and the printer control I/O unit 502 are connected through a bus 503. The bus 503 is a PCI EXPRESS bus as one of general-purpose high-speed control buses. The CPU 301 of the controller unit 200 makes system control of the image forming apparatus 100 and also controls the printer portion P while accessing the printer control I/O unit 502 through the bus 503. Various signals such as control trigger signal for the printer portion P, image signal for image creation, and the like are transmitted and received between the controller unit 200 and the printer control I/O unit 502 through the bus 503 at a high speed.

System control firmware 513 and printer control firmware 514 are executed in parallel as program modules by the CPU 301. To the printer control firmware 514, it is requested that a time delay is minimized as much as possible in terms of control precision in the image creation. However, if an execution load of the system control firmware 513 increases, an executing speed of the printer control firmware 514 often becomes slow, so that there is a case where the time delay which cannot be permitted occurs. To solve such a problem, in the embodiment, a multicore type CPU is used as a CPU 301. This is because it is necessary to enable the system control firmware 513 and the printer control firmware 514 to be independently executed without depending on the mutual execution loads.

The system control firmware 513 and the printer control firmware 514 have been stored in different partition areas in a memory area in the HDD unit 512. Thus, independence of mutual firmware programs is maintained and an influence of mutual interference is minimized. To prevent a decrease in control speed of each of the control firmware 513 and 514, each control firmware is temporarily read out of the HDD unit 512 and stored in the memory 303. Thus, instantaneous executing performance of each of the control firmware 513 and 514 is guaranteed.

With respect to such a control unit architecture, if there are the printer control firmware 514 and its execution environment and if there are the printer control I/O unit 502 and the control elements 504 to 508 connected thereto, the control of the printer portion P is enabled. Therefore, for example, if the execution environment of the printer control firmware 514 is constructed on an external apparatus which can provide the execution environment of the printer control firmware 514 and the printer control I/O unit 502 and the control elements 504 to 508 connected thereto are provided, the control unit architecture to control the printer portion P is constructed on the external apparatus.

Figure 6:
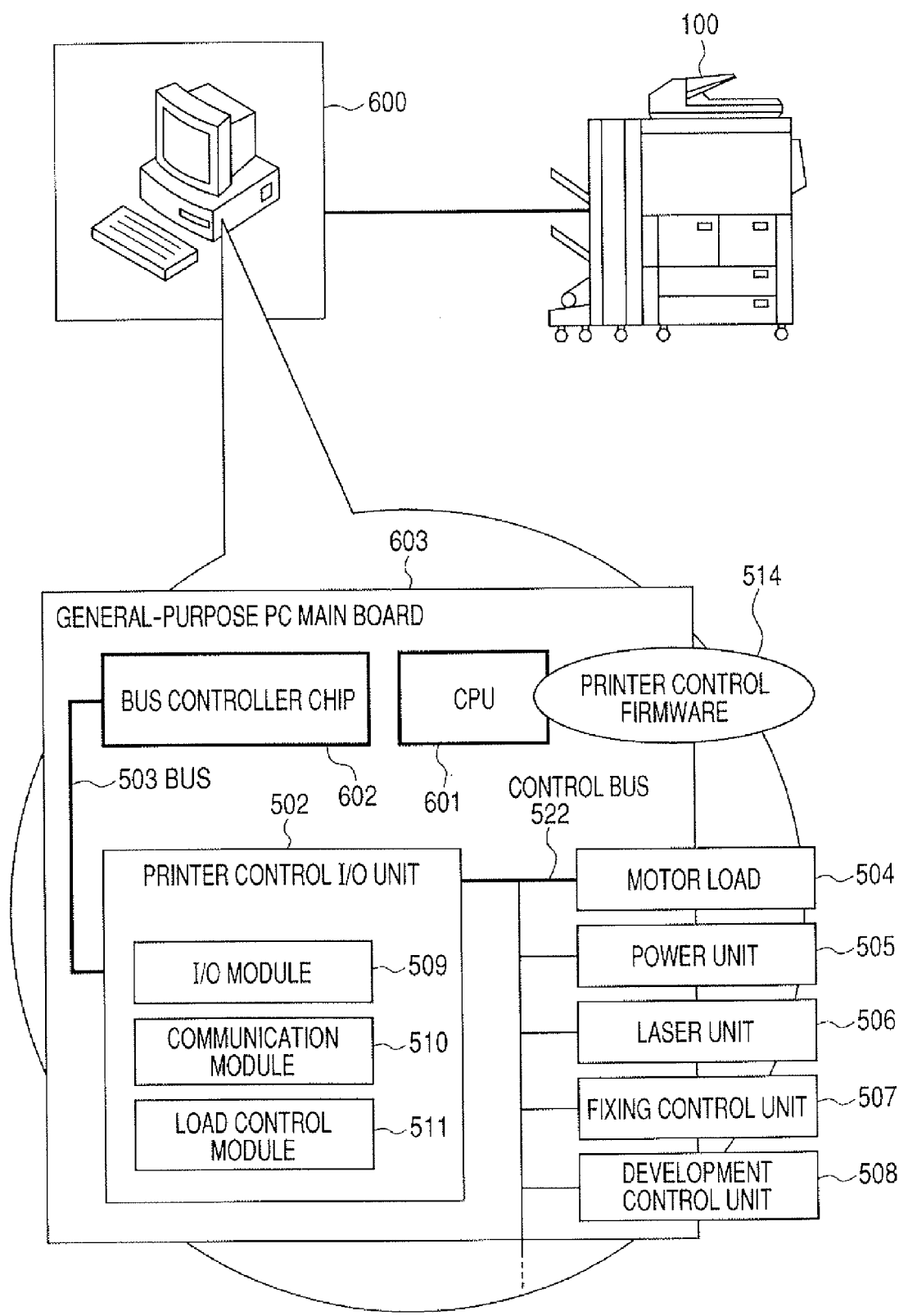
FIG. 6 is a diagram schematically showing a construction in the case of constructing printer control firmware 514 onto a PC 600.

As such an example, a construction in the case of constructing the printer control firmware 514 on a PC 600 is schematically shown in FIG. 6. In this case, although it is necessary to construct the printer control firmware 514 so that it can be executed on a general-purpose multitask OS (Operating System) for the general PCs, such a construction is relatively easily realized. This means that the printer control firmware 514 has a compatibility with the PC environment. The printer control I/O unit 502 which is connected through a bus controller chip 602 and the control elements 504 to 508 connected thereto are provided on the PC 600. Thus, the printer control I/O unit 502 and the control elements 504 to 508 connected thereto can be controlled through the bus controller chip 602 by the printer control firmware 514 which is executed by a CPU 601 of the PC 600. Consequently, the printer portion P of the image forming apparatus 100 can be controlled from the PC 600.

Figure 7:
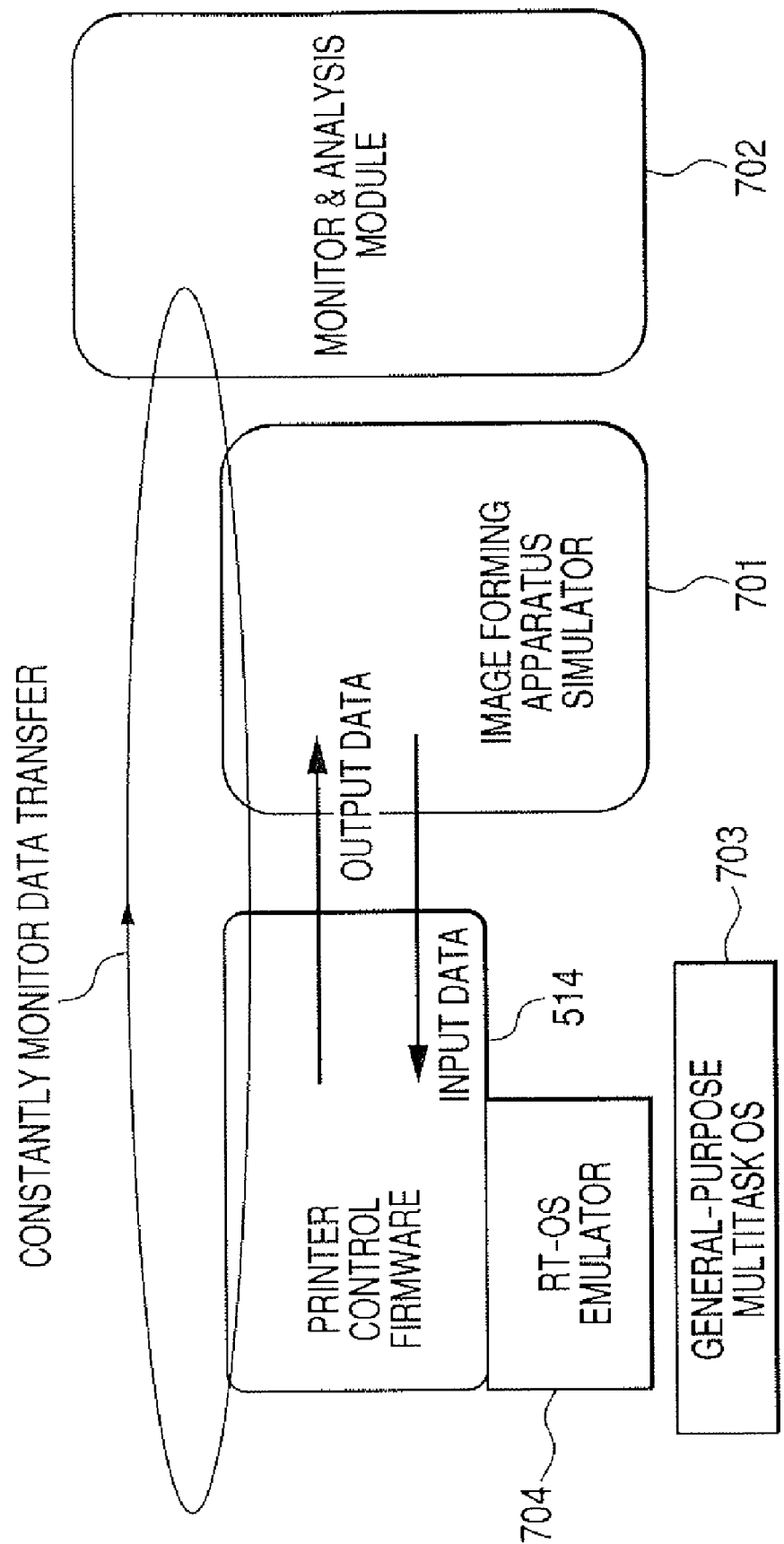
FIG. 7 is a block diagram showing a construction of a simulating apparatus constructed on the PC.

The case where a simulating apparatus for designing and verifying the printer control firmware 514 by the general-purpose PC is constructed is now considered in terms of the above point. Such a simulating apparatus will be described with reference to FIG. 7. FIG. 7 is a block diagram showing a construction of the simulating apparatus constructed on the PC.

In the simulating apparatus, as shown in FIG. 7, a real-time OS (RT-OS emulator) 704 is operated on a general-purpose PC multitask OS 703. The printer control firmware 514 is executed on the real-time OS 704.

The printer control firmware 514 transmits and receives data to/from an image forming apparatus simulator 701 which virtually constructs the image forming apparatus. Specifically speaking, the printer control firmware 514 transmits output data indicative of a control value as an event to the image forming apparatus simulator 701. When the output data is received, the image forming apparatus simulator 701 predicts the operation of the actual image forming apparatus according to the output data and falsely executes the predicted operation. Data corresponding to the falsely-executed operation is formed and a part of it is returned to the printer control firmware 514 as data indicative of a control result. The printer control firmware 514 uses the data returned from the image forming apparatus simulator 701 as input data which is obtained as a control result of the actual image forming apparatus and continues the control according to such data. The input and output data (I/O data) which is transmitted and received between the printer control firmware 514 and the image forming apparatus simulator 701 is always monitored by a monitor & analysis module 702.

The designer can grasp at any time an operation situation of the image forming apparatus simulator 701 under the control of the printer control firmware 514 through a UI (User Interface) of the monitor & analysis module 702. Thus, if the image forming apparatus simulator 701 executed the unexpected operation, the designer can determine that there is an improper portion in the control by the printer control firmware 514. The printer control firmware 514 can be modified so as to eliminate the improper portion and control quality of the printer control firmware 514 can be improved.

In the case of modifying the printer control firmware 514 by using such a simulating apparatus, it is an important point that the operation simulated by the image forming apparatus simulator 701 is made nearly identical to the operation of the actual image forming apparatus. That is, when the operation simulated by the image forming apparatus simulator 701 largely differs from the actual operation of the image forming apparatus, it is meaningless to modify the printer control firmware 514 in accordance with the operation of the image forming apparatus simulator 701.

However, the products of the same type execute the slightly different operations in dependence on a habit of the user, a use environment of the apparatus, a physical property of the sheet which is used, a use frequency of the apparatus, and the like. Particularly, from a viewpoint that the quality of a print image is maintained, the printer control firmware 514 is required to make complicated control in which those factors are combined. However, according to the image forming apparatus simulator 701, since a response to certain control data is merely approximately expressed in accordance with a control-like theoretical value, a rule of thumb, and the like, it is impossible to simulate the operation in which all of the factors are combined. Thus, it is impossible to sufficiently form the printer control firmware 514 in detail on the basis of only the simulation using the image forming apparatus simulator 701. Therefore, it is necessary to presume a combination of various using situations of the actual experimental model and actually make the experimental model operative, thereby raising perfection of the final printer control firmware 514.

There is a possibility that a similar problem occurs even after the image forming apparatus in which the printer control firmware 514 completed on the basis of the combination of various using situations of the experimental model has been implemented was shipped as a product to the market. This is because even in the operation test using the actual experimental model, it is practically impossible to presume the combination of all of the using environments and execute the test. Ordinarily, the general using environment of the user is presumed within a certain range and the printer control firmware 514 is formed while confirming that no problem actually occurs in such a range. However, the using situation of the image forming apparatus shipped to the market differs every user and is different from the using situation which has initially been presumed. In such a case, the operation due to the control of the printer control firmware 514 becomes the unexpected operation, so that a problem such as defective image, misdetection of an error, or the like occurs.

In the embodiment, therefore, an approximate expression to improve identifying precision of the image forming apparatus simulator 701 is implemented in the image forming apparatus simulator 701.

Figure 8:
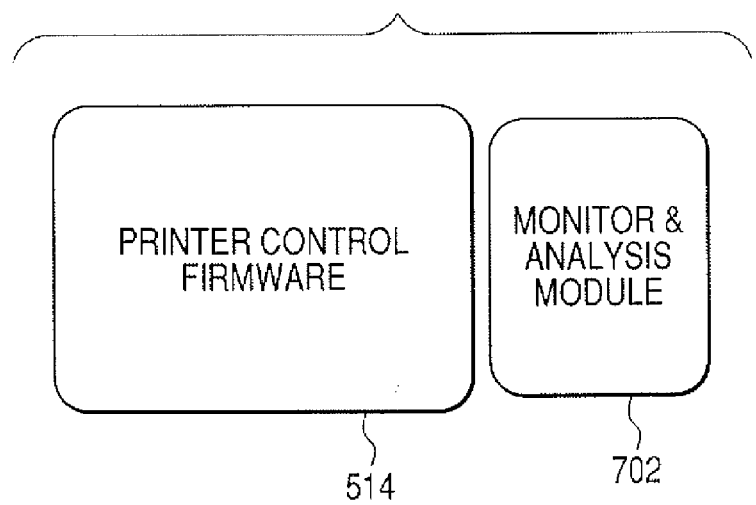
FIG. 8 is a block diagram showing the printer control firmware 514 and a monitor & analysis module 702 assembled in the control unit architecture in the image forming apparatus.
Figure 9A:
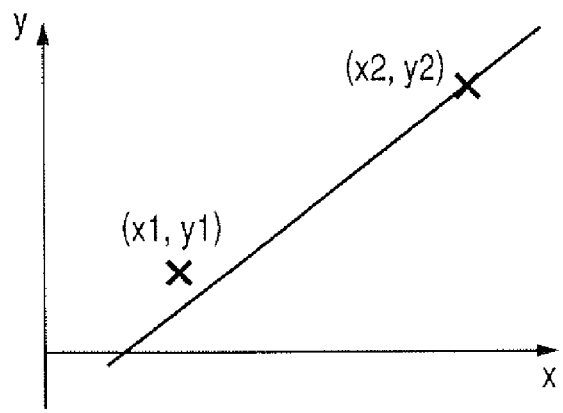
FIGS. 9A and 9B are graphs each showing a relation between a control output value x and an input value y corresponding to a control result and its approximate expression.
Figure 9B:
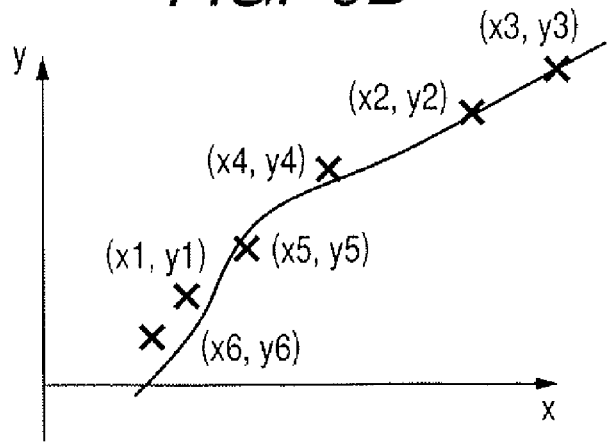

A calculating method of such an approximate expression will be described with reference to FIGS. 8, 9A, and 9B. FIG. 8 is a block diagram showing the printer control firmware 514 and the monitor & analysis module 702 assembled in the control unit architecture in the image forming apparatus. FIGS. 9A and 9B are graphs each showing a relation between a control output value x and an input value y corresponding to the control result and its approximate expression.

In the control unit architecture of the image forming apparatus as an experimental model or a product, the printer control firmware 514 and the monitor & analysis module 702 are assembled as a part of its program. The approximate expression to improve the identifying precision of the image forming apparatus simulator 701 is obtained by the printer control firmware 514 and the monitor & analysis module 702 of the image forming apparatus.

In the image forming apparatus as an experimental model or a product, when the control is made by the printer control firmware 514, the monitor & analysis module 702 always monitors the input/output data between the printer control firmware 514 and the printer portion P. The output data indicative of the control value is outputted to the printer portion P from the printer control firmware 514. The output data is outputted as a result of some control-like discrimination by the printer control firmware 514. As output data, there are a driving pulse of the motor, an output signal of a port, an output setting value to an A/D converter, and the like. The printer portion P operates in response to the output data, so that it returns the result, that is, the data according to the control result as input data to the printer control firmware 514. As input data according to the control result, there are an input port signal, an interruption signal value, a digital conversion value from the A/D converter, and the like. The time-series data regarding those inputs/outputs is stored in the HDD unit 512.

The time-series data regarding the inputs/outputs which have been stored in the HDD unit 512 is periodically collected by a service person or the like through the external I/F 213. In the case of the image forming apparatus connected to the network through the LAN interface apparatus 402, the time-series data regarding the inputs/outputs which have been stored in the HDD unit 512 is collected by a PC connected to the network through the LAN interface apparatus 402. As mentioned above, the time-series data regarding the actual control output values and the input values according to the control result can be obtained from a number of image forming apparatuses shipped as products to the market and from the image forming apparatus at the stage of examining the experimental model.

By using the time-series data group regarding the control output values and the input values according to the control result obtained in this manner, the identifying precision of the image forming apparatus simulator 701 on the PC can be improved.

For example, it is assumed that a relation between an arbitrary control output value x and the input value y according to the control result is expressed by a function $y=f(x)$. When it is assumed here that two data $(x1, y1)$ and $(x2, y2)$ were obtained as data showing the relation between x and y, a relational expression of x and y is approximated by a linear equation $y=ax+b$ connecting those two points as shown in FIG. 9A. However, if a plurality of data $(x1, y1), \ldots, (xn, yn)$ were obtained as data showing the relation between x and y, the a relational expression of x and y is approximated by a polynomial $y=ax+bx2+, \ldots, mxn$. That is, the relation between x and y can be expressed as a multidimensional function which passes a neighborhood of a plurality of data trains. Therefore, if the number of information regarding the data trains increases, the relation between x and y can be approximated at higher precision.

In place of the method of obtaining (y) by a function $y=f(x1)$ using only one control output value xa as a variable, it is also possible to add other control output values xb, xc, . . . as variables and approximate the input value y according to the control result by a function $y=f(xa, xb, xc, \ldots)$. In such a case, the above method is effective in the case where the control output values xb, xc, . . . other than the control output value xa dominantly determine the input value y from a result obtained by statistically analyzing the time-series data showing the relation among many inputs and outputs.

In this manner, if the approximate expression showing the relation between the control output value x and the input value y according to the control result is obtained and the obtained approximate expression is assembled into the image forming apparatus simulator 701, the identifying precision of the simulation result by the image forming apparatus simulator 701 can be improved. That is, on the PC, the result of the simulation executed by the image forming apparatus simulator 701 under the control of the printer control firmware 514 is very close to the control result obtained under the actual control in the image forming apparatus as an experimental model or a product.

Differences between the image forming apparatus simulator 701 and the image forming apparatus as an actual apparatus are examined from various viewpoints. A result of the examination is reflected to an identifying algorithm of the image forming apparatus simulator 701. That is, the simulation result of the image forming apparatus simulator 701 can be developed from the result based on the simple approximate expression to the result based on the approximate expression of the function of several variables. The simulation result can be set to the result according to the more practical control result. Thus, the control simulation which further conforms with the actual apparatus can be executed by using the image forming apparatus simulator 701 under the control of the printer control firmware 514. The problems of the printer control firmware 514 are extracted on the basis of the simulation result. The correction of the printer control firmware 514 to solve such problems can be more precisely and efficiently made. The correction of the printer control firmware 514 to improve the control performance can be more precisely made.

The foregoing approximate expression can be obtained on the PC in which the image forming apparatus simulator 701 has been assembled. In this case, arithmetic operating software for obtaining the foregoing approximate expression on the basis of the obtained time-series data group regarding the control output values and the input values according to the control result is implemented in the PC. It is sufficient that the approximate expression obtained by the arithmetic operating software is implemented in the image forming apparatus simulator 701. It is also possible to use a method whereby the approximate expression is obtained from another PC and the obtained approximate expression is implemented in the image forming apparatus simulator 701.

Figure 10:
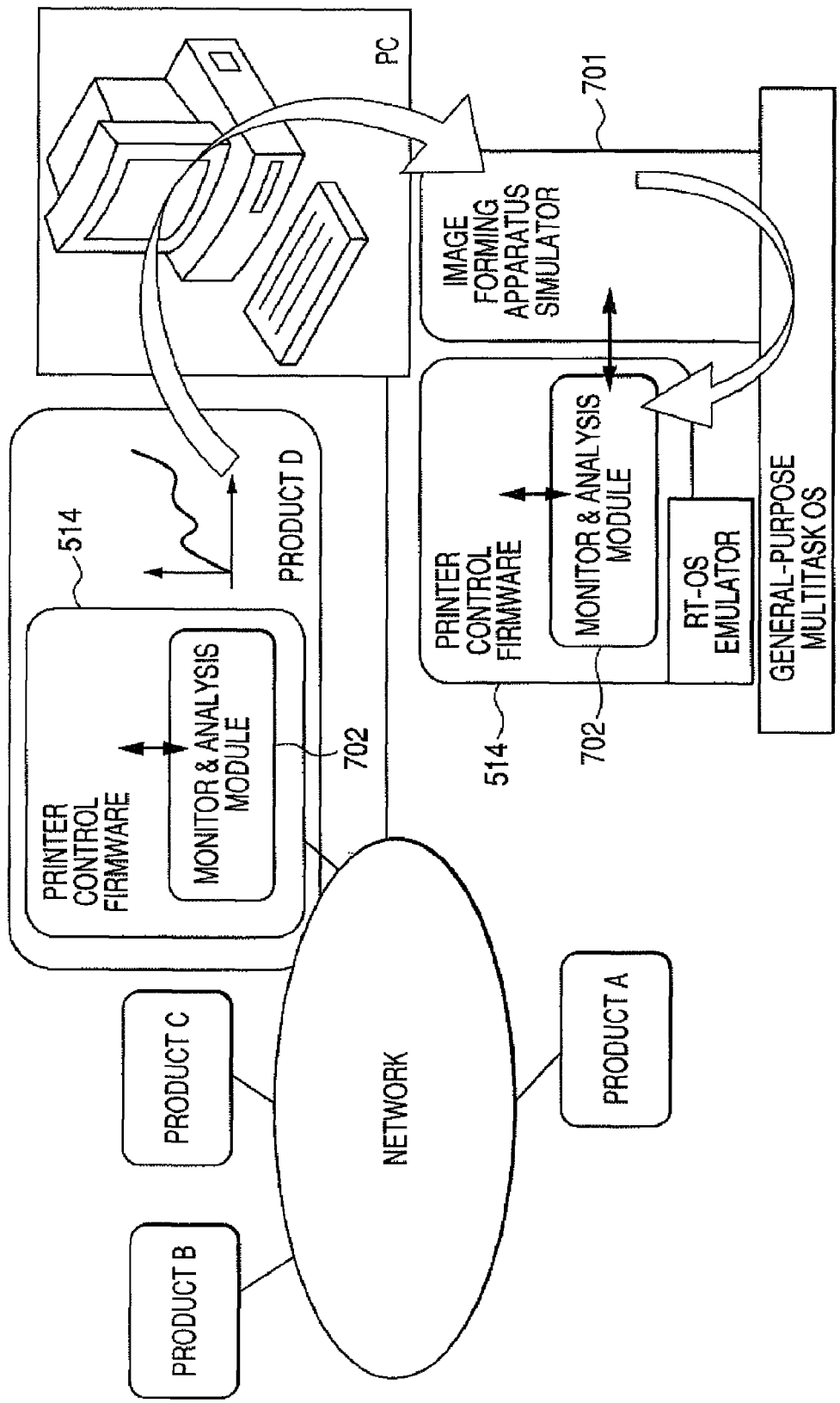
FIG. 10 is a diagram schematically showing a series of operations in a range from collection of time-series data regarding inputs/outputs of control in the image forming apparatuses connected to a network to simulation of the image forming apparatus using the collected time-series data.

The case of performing the operation verification and the like of the printer control firmware 514 of the image forming apparatuses connected to the network will now be described with reference to FIG. 10. FIG. 10 is a diagram schematically showing a series of operations in a range from the collection of the time-series data regarding the inputs/outputs of the control in the image forming apparatuses connected to the network to the simulation of the image forming apparatus using the collected time-series data.

A system in which a plurality of image forming apparatuses A to D (shown as products A to D here) as products are connected to the network as shown in FIG. 10 will now be described as an example. The printer control firmware 514 and the monitor & analysis module 702 have been assembled in the control unit architecture of each of the image forming apparatuses A to D. In each of the image forming apparatuses A to D, the time-series data regarding the actual control output values between the printer control firmware 514 and the printer portion P and the input values according to the control result is stored into the HDD unit 512 by the monitor & analysis module 702.

In the case of obtaining the time-series data from the image forming apparatus D, the PC connected to the network accesses the image forming apparatus D and collects the time-series data stored in the HDD unit 512. An approximate expression to approximate the collected time-series data is obtained. The calculation of the approximate expression can be executed by the PC or another PC. The obtained approximate expression is implemented into the image forming apparatus simulator 701 of the simulating apparatus constructed on the PC.

Subsequently, the real-time OS (RT-OS emulator) 704 is operated on the general-purpose PC multitask OS 703 of the PC and the printer control firmware 514 is executed on the real-time OS 704. The control simulation using the image forming apparatus simulator 701 is executed under the control of the printer control firmware 514.

In this manner, the time-series data group regarding the control output values and the input values according to the control result is obtained from the image forming apparatus D, and the approximate expression to improve the identifying precision of the image forming apparatus simulator 701 can be obtained by using the time-series data group. Thus, the simulation result for the printer control firmware 514 of the image forming apparatus D to which to the actual using situation or the like of the image forming apparatus D has been reflected can be obtained. The printer control firmware 514 can be modified according to the actual using situation.

In the embodiment, the time-series data group is collected from the image forming apparatus through the external I/F 213 by the service person or the like or collected by the PC through the network. However, the collecting method of the time-series data is not limited to such a method. For example, it is also possible to use a method of collecting the time-series data from the image forming apparatus through a public analog line, a method of collecting the time-series data by wireless communication or short-distance wireless communication, or the like.

In the embodiment, the polynomial approximate expression to approximate the time-series data which is obtained from the image forming apparatus is used for the identifying algorithm. However, the identifying algorithm is not limited to such a polynomial approximate expression. It is also possible to use a method whereby a correlation expression of the time-series data is obtained by using a data interpolating method according to a general statistic method using a spline function, a fuzzy function, a neural network, or the like and this correlation expression is used for the identifying algorithm.

The object of the invention is also accomplished by a method whereby a storing medium in which program codes of the software to realize the functions of each of the embodiments mentioned above have been stored is supplied to a system or an apparatus and a computer (or a CPU, an MPU, or the like) of the system or apparatus reads out and executes the program codes stored in the storing medium.

In this case, the program codes themselves read out of the storing medium realize the functions of each of the embodiments mentioned above. The program codes and the storing medium in which the program codes have been stored construct the invention.

As a storing medium for supplying the program codes, for example, it is possible to use a floppy (registered trademark) disk, a hard disk, a magnetooptic disk, an optical disk such as CD-ROM, CD-R, CD-RW, DVD-ROM, DVD-RAM, DVD-RW, DVD+RW, or the like, a magnetic tape, a non-volatile memory card, a ROM, or the like. The program codes can be also downloaded through the network.

The invention incorporates not only the case where a computer executes the read-out program codes, so that the functions of each of the embodiments mentioned above are realized but also the case where an OS (Operating System) or the like which is operating on the computer executes a part or all of actual processes on the basis of instructions of the program codes and the functions of each of the embodiments mentioned above are realized by those processes.

Further, the invention incorporates the case where the program codes read out of the storing medium are written into a memory provided for a function expanding board inserted in the computer or a function expanding unit connected to the computer, thereafter, a CPU or the like provided for the function expanding board or the function expanding unit executes a part or all of the actual processes on the basis of instructions of the program codes, and the functions of each of the embodiments mentioned above are realized by those processes.

As described above, according to the embodiments, the operation of the image forming apparatus can be simulated at high identifying precision. Thus, the control result obtained by the simulation can be made nearly identical to the actual control result and the operation can be verified at high precision.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-366420, filed Dec. 20, 2005, which is hereby incorporated by reference herein in its entirety.

What is claimed is:

1. A simulating system comprising:
a data retrieving device that time-sequentially retrieves a control value, which is outputted from a control system in an image forming apparatus to a controlled system, and an input value, which is inputted from the controlled system to the control system as a simulated control result of the image forming apparatus, the simulated control result being a control result that would be generated by the image forming apparatus if the image forming apparatus had executed an operation based on the control value;
a data storing device that stores a time-series data group including a plurality of the control values, which have time-sequentially been retrieved by the data retrieving device, and the input values corresponding to the control values; and
a simulating device in the controlled system which simulates the operation based on one of the control values and which generates the simulated control result corresponding to the one of the control values as a result of the simulating of the operation,
wherein a correlation between each of the control values and the input value corresponding to each of the control values included in the time-series data group stored in the data storing device is implemented by the simulating device,
wherein the control system controls operation of the image forming apparatus when not interacting with the controlled system, and
wherein the controlled system virtually constructs the image forming apparatus.

2. A system according to claim 1, further comprising an arithmetic operating device which obtains the correlation between each of the control values and the input value corresponding to each of the control values included in the time-series data group on the basis of the time-series data group stored in the data storing device.

3. A system according to claim 2, wherein
the data retrieving device and the data storing device are assembled in the image forming apparatus,
the simulating device and the arithmetic operating device are assembled in a computer which can communicate with the image forming apparatus, and the arithmetic operating device obtains the time-series data stored in the data storing device by the communication between the computer and the image forming apparatus.

4. A system according to claim 2, wherein the arithmetic operating device obtains a function for approximating the correlation as a correlation between each of the control values and the input value corresponding to each of the control values included in the time-series data group on the basis of the time-series data group stored in the data storing device.

5. A system according to claim 1, further comprising an output device which outputs the control result simulated by the simulating device.

6. A system according to claim 1, wherein the simulating device simulates the operation under a same control environment as that of the control system.

7. A simulating apparatus for simulating the operation of an image forming apparatus including (a) a data retrieving device that time-sequentially retrieves a control value, which is outputted from a control system to a controlled system, and an input value, which is inputted from the controlled system to the control system as a simulated control result of the image forming apparatus, the simulated control result being a control result that would be generated by the image forming apparatus if the image forming apparatus had executed an operation based on the control value, and (b) a data storing device that stores a time-series data group including a plurality of the control values, which have time-sequentially been retrieved by the data retrieving device, and the input values corresponding to the control values, the simulating apparatus comprising:

a simulating device in the controlled system which simulates the operation based on one of the control values and which generates the simulated control result corresponding to the one of the control values as a result of the simulating of the operation, wherein a correlation between each of the control values and the input value corresponding to each of the control values included in the time-series data group stored in the data storing device is implemented by the simulating device, wherein the control system controls operation of the image forming apparatus when not interacting with the controlled system, and wherein the controlled system virtually constructs the image forming apparatus.

8. An image forming apparatus comprising:

a data retrieving device that time-sequentially retrieves a control value, which is outputted from a control system to a controlled system, and an input value, which is inputted from the controlled system to the control system as a simulated control result of the image forming apparatus, the simulated control result being a control result that would be generated by the image forming apparatus if the image forming apparatus had executed an operation based on the control value; and a data storing device that stores a time-series data group including a plurality of the control values, which have time-sequentially been retrieved by the data retrieving device, and the input values corresponding to the control values, wherein a correlation between each of the control values and the input value corresponding to each of the control values included in the time-series data group is used when the simulated control result is generated by a simulating device in the controlled system, wherein the control system controls operation of the image forming apparatus when not interacting with the controlled system, and wherein the controlled system virtually constructs the image forming apparatus.

9. A simulating method comprising:

a data retrieving step of time-sequentially retrieving a control value, which is outputted from a control system in an image forming apparatus to a controlled system, and an input value, which is inputted from the controlled system to the control system as a simulated control result of the image forming apparatus, the simulated control result being a control result that would be generated by the image forming apparatus if the image forming apparatus had executed an operation based on the control value;

a data storing step of storing a time-series data group including a plurality of the control values, which have time-sequentially been retrieved in the data retrieving step, and the input values corresponding to the control values into a storing device; and a simulating step performed by the controlled system of simulating the operation based on one of the control values and of generating the simulated control result corresponding to the one of the control values as a result of the simulating of the operation, wherein a correlation between each of the control values and the input value corresponding to each of the control values included in the time-series data group stored in the storing device is implemented by the simulating step, wherein the control system controls operation of the image forming apparatus when not interacting with the controlled system, and wherein the controlled system virtually constructs the image forming apparatus.

10. A method according to claim 9, further comprising an arithmetic operating step of obtaining the correlation between each of the control values and the input value corresponding to each of the control values included in the time-series data group on the basis of the time-series data group stored in the storing device.

11. A method according to claim 10, wherein in the arithmetic operating step, a function for approximating the correlation is obtained as a correlation between each of the control values and the input value corresponding to each of the control values included in the time-series data group on the basis of the time-series data group stored in the storing device.

12. A method according to claim 9, further comprising an output step of outputting the simulated control result.

* * * * *